(12) United States Patent
Greene et al.

(10) Patent No.: US 9,127,730 B2
(45) Date of Patent: Sep. 8, 2015

(54) ELECTRIC ACTUATOR MODULE FOR SELECTABLE CLUTCH

(71) Applicant: Magna Powertrain of America, Inc., Troy, MI (US)

(72) Inventors: Darrell Greene, Bradford (CA); Adrian Cioc, Richmond Hill (CA)

(73) Assignee: Magna Powertrain of America, Inc., Troy, MI (US)

( * ) Notice: Subject to any disclaimer, the term of this patent is extended or adjusted under 35 U.S.C. 154(b) by 189 days.

(21) Appl. No.: 13/838,336

(22) Filed: Mar. 15, 2013

(65) Prior Publication Data

US 2014/0102844 A1  Apr. 17, 2014

Related U.S. Application Data

(60) Provisional application No. 61/715,121, filed on Oct. 17, 2012.

(51) Int. Cl.
| | |
|---|---|
| F16D 41/16 | (2006.01) |
| F16D 27/12 | (2006.01) |
| F16D 41/08 | (2006.01) |
| F16D 27/00 | (2006.01) |

(52) U.S. Cl.
CPC .............. *F16D 41/16* (2013.01); *F16D 41/084* (2013.01); *F16D 27/00* (2013.01)

(58) Field of Classification Search
CPC ................................ F16D 41/14; F16D 27/102
See application file for complete search history.

(56) References Cited

U.S. PATENT DOCUMENTS

| 1,900,787 | A | * | 3/1933 | Baugnee | 192/48.2 |
|---|---|---|---|---|---|
| 4,222,473 | A | * | 9/1980 | Kopich | 192/43.1 |
| 5,927,455 | A | | 7/1999 | Baker et al. | |
| 5,996,758 | A | | 12/1999 | Baxter, Jr. | |
| 7,383,930 | B2 | | 6/2008 | Kimes et al. | |
| 7,432,445 | B2 | | 10/2008 | Bird et al. | |
| 7,448,481 | B2 | | 11/2008 | Kimes et al. | |
| 7,451,862 | B2 | | 11/2008 | Kimes et al. | |
| 7,455,157 | B2 | | 11/2008 | Kimes et al. | |
| 7,475,763 | B2 | | 1/2009 | Jegatheeson | |
| 7,500,548 | B2 | | 3/2009 | Kimes et al. | |
| 7,614,486 | B2 | | 11/2009 | Bird et al. | |

(Continued)

OTHER PUBLICATIONS

International Search Report mailed Nov. 17, 2014; Written Opinion.

*Primary Examiner* — Richard Lorence
(74) *Attorney, Agent, or Firm* — Dickinson Wright PLLC

(57) ABSTRACT

A clutch module which includes a first rotating member including at least one strut actuation module and a second engaged member including cam surfaces thereon for engagement by said strut actuation module. The strut actuation module includes a frame with a strut pivotally movable with respect to the frame. The strut includes an engagement end and a base end including a first side and a second side thereof. A pin or post portion extends from the frame and has an insulated bobbin with an energizable coil surrounding the bobbin. A U-shaped member including a pair of actuation legs is attached to the pin member and forms a magnetic gap between the base end of the strut and peripheral ends of the legs, such that when the coil is energized the peripheral ends of the legs are polarized in a first polarity and the frame and the strut are polarized with an opposite polarity thereby biasing the strut toward the peripheral ends and pivoting the actuation end into engagement with a cam surface of the engagement member.

20 Claims, 7 Drawing Sheets

(56) References Cited

U.S. PATENT DOCUMENTS

| | | |
|---|---|---|
| 7,661,518 B2 | 2/2010 | Kimes |
| 7,690,492 B2 | 4/2010 | Gooden et al. |
| 7,735,546 B2 | 6/2010 | Bird et al. |
| 8,276,725 B2 | 10/2012 | Swales et al. |
| 8,403,123 B2 | 3/2013 | Bird et al. |
| 8,418,825 B2 | 4/2013 | Bird |
| 2003/0057047 A1 | 3/2003 | Jin |
| 2004/0159517 A1* | 8/2004 | Thomas .......................... 192/39 |
| 2007/0056825 A1 | 3/2007 | Fetting, Jr. et al. |
| 2008/0142243 A1 | 6/2008 | Bird et al. |
| 2009/0145718 A1 | 6/2009 | Chiesa et al. |
| 2009/0194381 A1 | 8/2009 | Samie et al. |
| 2010/0140041 A1 | 6/2010 | Wittkopp et al. |
| 2011/0011694 A1* | 1/2011 | Swales et al. ................ 192/48.2 |
| 2011/0057522 A1 | 3/2011 | Blessing et al. |
| 2011/0290608 A1 | 12/2011 | Bird et al. |
| 2012/0100948 A1 | 4/2012 | Lin et al. |
| 2012/0103745 A1 | 5/2012 | Bird |
| 2012/0103746 A1 | 5/2012 | Bird |
| 2012/0103747 A1 | 5/2012 | Bird |
| 2012/0123635 A1 | 5/2012 | Brevick et al. |
| 2012/0152683 A1* | 6/2012 | Kimes .......................... 192/45.1 |
| 2013/0056327 A1 | 3/2013 | Schraff |
| 2013/0213027 A1 | 8/2013 | Bird et al. |

* cited by examiner

ELECTRIC ACTUATOR MODULE FOR SELECTABLE CLUTCH

CROSS-REFERENCE TO RELATED APPLICATIONS

This application claims the benefit of U.S. Provisional Application No. 61/715,121, filed Oct. 17, 2012 which is incorporated herein by reference thereto.

FIELD OF THE INVENTION

The present disclosure relates generally to an actuator module for a selectable clutch. More particularly, the present disclosure relates to a transmission for use in a drive train of a vehicle (such as an automobile truck, van, utility, industrial equipment, fleet, cargo or the like) including a strut-type actuator module for use in selectively actuating a clutch in the transmission.

BACKGROUND OF THE INVENTION

A selectable one way clutch (OWC) to be used in automatic transmissions replaces the friction discs OWC actuated by oil pressure with a strut-based selectable OWC actuated by an electromagnetic module controlled by the transmission ECU. This reduces the drag losses associated with the friction disc clutch of prior designs when it is open and over-running continuously while the transmission is running and may also offer cost reductions associated with the removal of the components of the friction discs clutch (friction discs, pressure plates, end plate, piston and seals).

In one prior art embodiment of a selectable OWC for a transmission, a coil is wound around a steel magnetic pole, which when electrically energized, acts to close the gap (such as an air gap) between the end poles (i.e., north and south) and the one-way clutch strut end. In this design, the pole ends are magnetized, which work to attract the end portion of the strut, which is not magnetized.

In the above concept, the clutch housing does not play any role in the magnetic circuit; it only controls the relative position of the coil and struts. When an electrical charge is applied, the mechanism pulls the strut from the open position toward the closed position. The pole is magnetized and the strut is not magnetized so the housing is not part of the magnetic circuit or path.

While this arrangement is one method of actuating a strut, it requires single pole magnetic attraction which is not as robust or reliable of a lock up as might be desired depending on the application. Therefore, it is desirable in the art to provide a more robust actuation of a strut in a selectable OWC.

SUMMARY OF THE INVENTION

In accordance with the present invention there is provided a clutch assembly. The clutch assembly includes a clutch module and at least one strut actuation module. The clutch module includes a first clutch member to which the at least one strut actuation module is mounted, and a second clutch member including cam surfaces thereon for selective engagement by the strut actuation module. The strut actuation module includes a frame fixed to the first clutch member with a strut pivotally movable with respect to the frame. The strut includes an engagement end and a base end including a first side and a second side thereof. A pin or post portion extends from the frame and has an insulated bobbin with an energizable coil surrounding the bobbin. A U-shaped member including a pair of actuation legs is attached to the pin member and forms a magnetic gap between the base end of the strut and peripheral ends of the actuation legs, such that when the coil is energized the peripheral ends of the actuation legs are polarized in a first polarity and the frame and the strut are polarized with an opposite polarity thereby biasing the strut toward the peripheral ends and pivoting the actuation end into engagement with one of the cam surfaces of the second clutch member.

In alternate embodiments, bi-directional strut arrangements are provided.

In accordance with the present invention, there is provided an improved device and control strategy for an OWC clutch for use in a transmission in a vehicle wherein the housing of the clutch actuator is included as part of the magnetic circuit for actuating the mechanism to create a stronger magnetic actuator device and to provide greater accuracy and control while reducing the power consumption and other negative drawbacks of the known mechanisms and controls.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF DRAWINGS

The present invention will become more fully understood from the detailed description and the accompanying drawings, wherein.

DETAILED DESCRIPTION OF THE PREFERRED EMBODIMENTS

Figure 1:
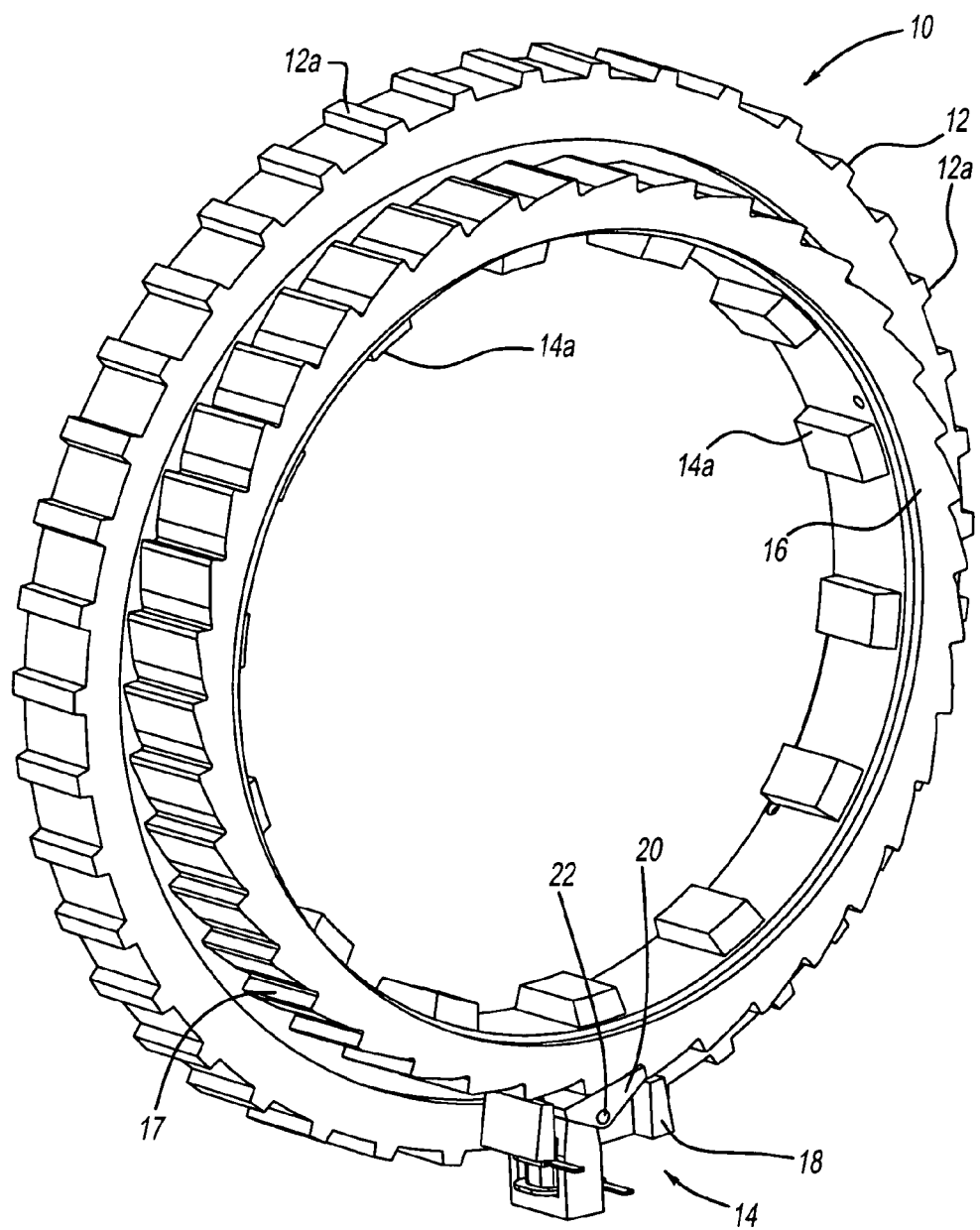
FIG. 1 is an assembly view of a clutch assembly showing a clutch module and a strut actuation module in accordance with the present invention.

In accordance with the present invention there is provided a clutch assembly, generally shown at 10, of the type for example for use in a transmission (not shown) which is controlled using an on-off relay to actuate a clutch mechanism.

Referring to the drawings, and initially to FIGS. 1-4, there is provided a clutch assembly 10 having a clutch module and an actuation module. The clutch module includes a first clutch member 12 supporting at least one strut actuation module 14, and a second clutch member 16 having cam surfaces 17 thereon for selective engagement by strut actuation module 14. The clutch members 12 and 16 are aligned axially adjacent to each other and at least one of the clutch members is adapted to rotate relative to the other clutch member. The clutch members 12 and 16 include engagement teeth or splines 12(a) and 14(a) respectively to facilitate connection of each to another rotary or non-rotary component of the transmission. The strut actuation module 14 includes a frame 18 with a strut 20 pivotally movable with respect to frame 18 about a pivot 22. Frame 18 is adapted to be fixedly secured to first clutch member 12 in the configuration shown. The strut 20 includes an engagement end 26 and a base end 24 and further includes a first side 28 and a second side 30. A pin or post portion 32 extends from the frame 18 and has an insulated bobbin 34 with an energizable coil 36 surrounding the bobbin 34. A U-shaped member 37 is secured magnetically and mechanically to the post 32 by way of a screw or other fastener 39. The U-shaped member 37 includes a pair of actuation legs 38 and 40. A biasing spring 42 (such as the accordion spring shown) is provided in a bore 44 in the frame 18. At rest, the biasing spring 42 biases the strut 20 out of engagement with the cam surfaces 17 to provide a normally disengaged freewheeling condition, whereby second clutch member 16 is permitted to rotate relative to first clutch member 12. The peripheral ends 46 and 48 form a magnetic gap between the base end 24 of the strut 20 and peripheral ends 46 and 48 of the legs 38 and 40.

When the coil 36 is energized, the peripheral ends 46 and 48 of the legs 38 and 40 are polarized in a first polarity and the frame 18 and the strut 20 are polarized with an opposite polarity, thereby biasing the strut 20 toward the peripheral ends 46 and 48 and pivoting the engagement end 26 into engagement with a cam surface 17 of the second clutch member 16.

Typically, the actuation module is contained in a metallic housing. Thus in the present invention, the housing can be used as an integral component of a magnetic circuit for controlling the clutch. When the coil 36 is powered, the housing is magnetized and will take a particular polarity (i.e., either north or south as may be desired) that is opposite from a polarity of the magnetic poles of an actuator, in this instance the U-shaped member 37 coupled to the clutch mechanism. Since the housing is in contact with struts, the struts will be magnetized with the same polarity as the housing. In this application, the attraction force between the strut ends and the magnetic poles of the U-shaped member 37 (i.e., across the air gap between them) is greatly increased as compared with the case where the struts carry a neutral charge from a magnetic perspective.

While the strut 20 is shown to be pivotal about a pin 22 it is to be appreciated by those skilled in the art that the strut can be configured as being pivotable in a suitable housing in the member 12.

Figure 2:
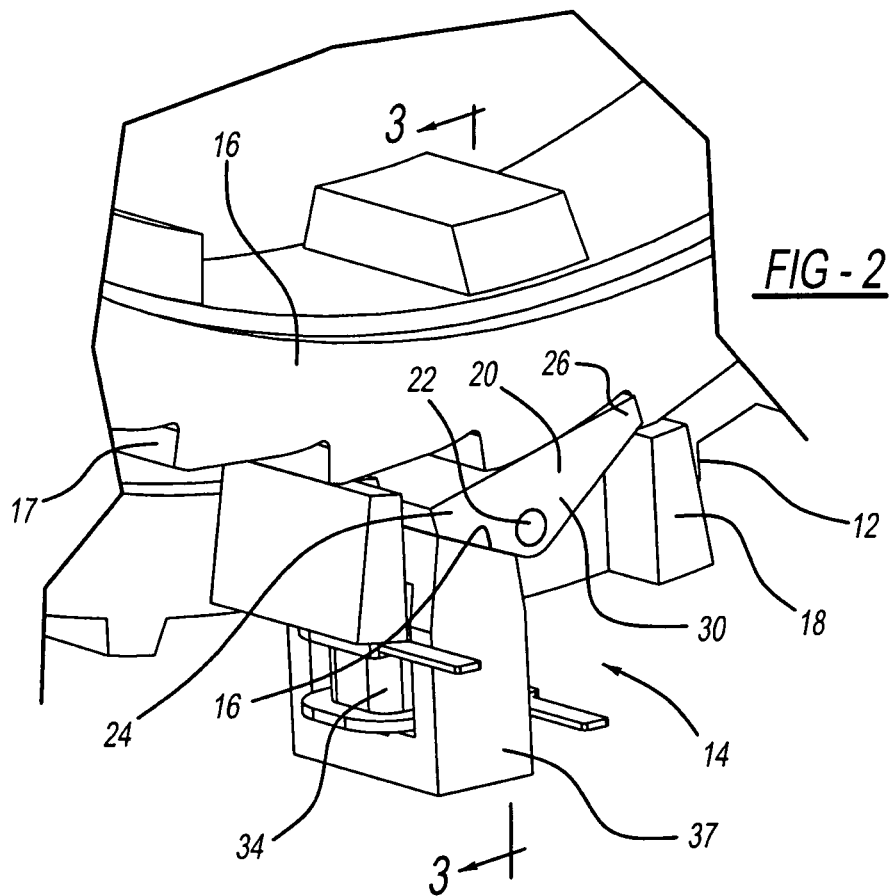
FIG. 2 is a detailed view of the actuation module of FIG. 1 of the present invention.
Figure 3:
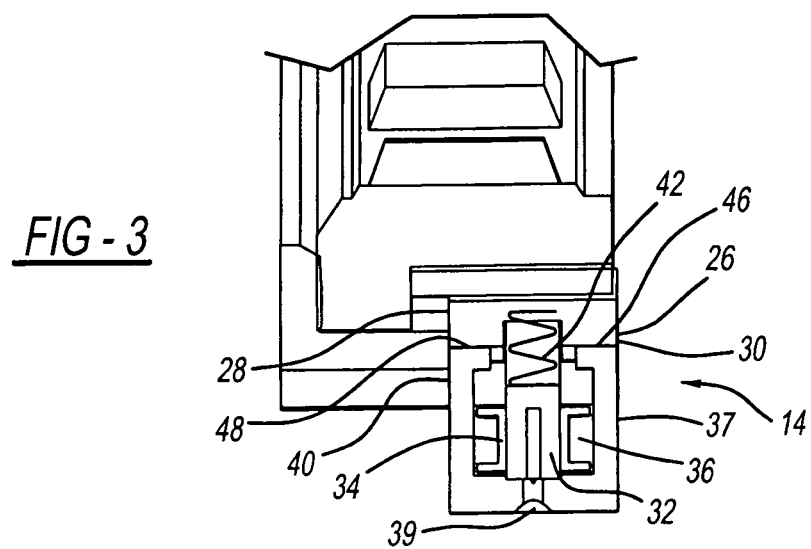
FIG. 3 is a sectional view of the actuation module of FIG. 2 taken along line 3-3 of FIG. 2.
Figure 4:
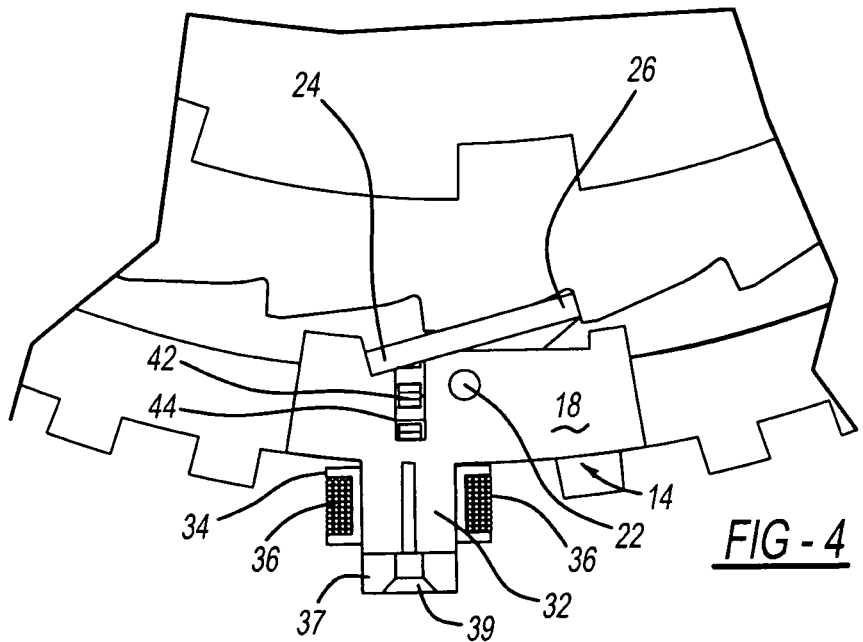
FIG. 4 is a sectional view of the actuation module of FIG. 2.
Figure 5:
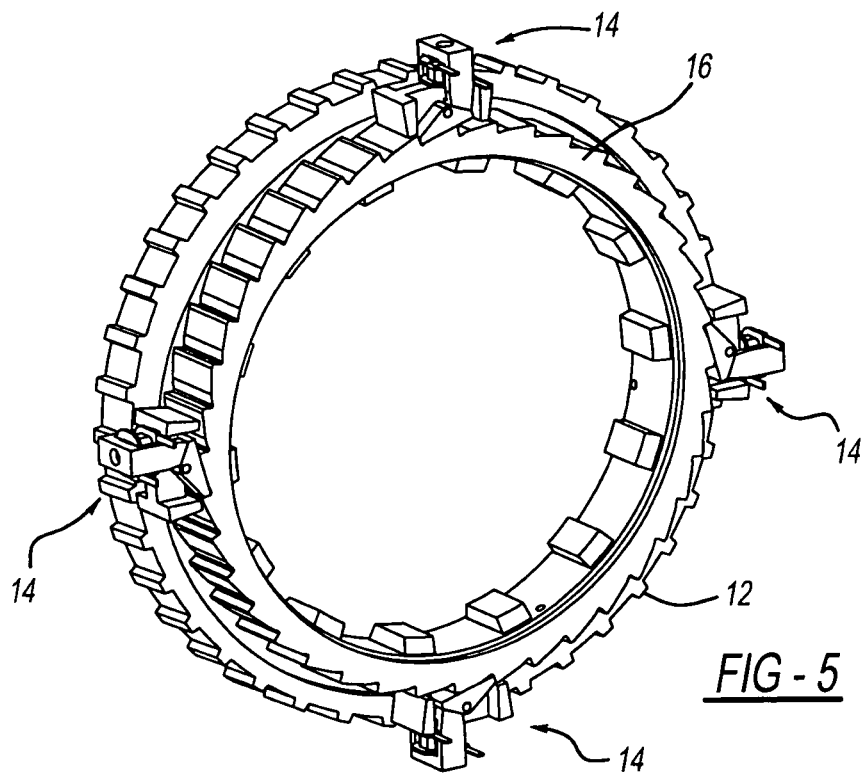
FIG. 5 is an assembly view of a clutch assembly similar to FIG. 1 but now showing a plurality of the actuation modules arranged in accordance with the present invention.
Figure 6:
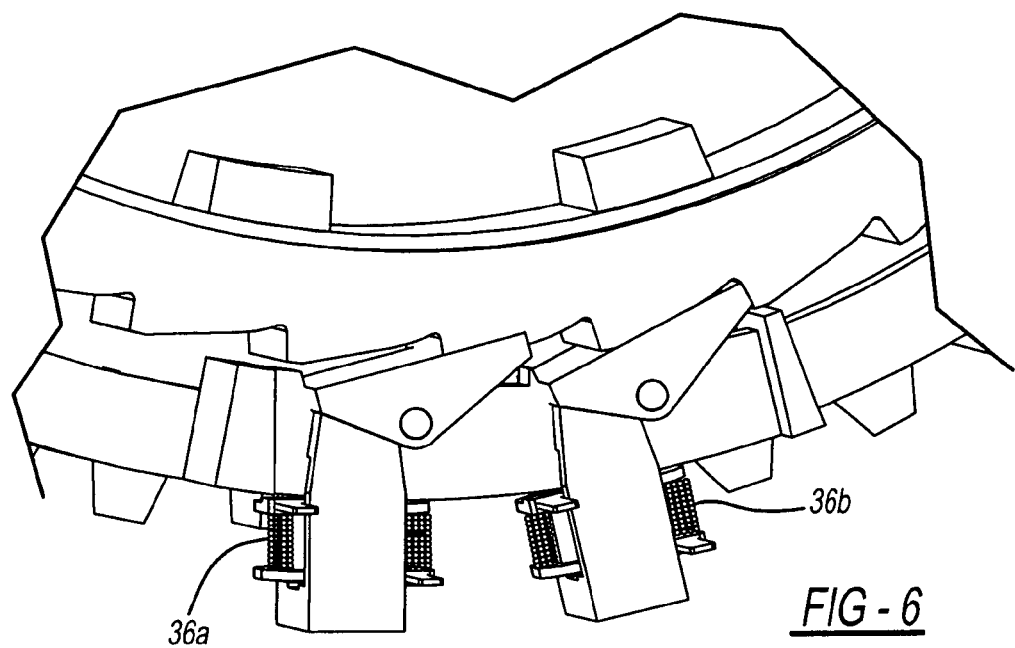
FIG. 6 is a detailed view of an alternate embodiment of an actuation module associated with the clutch module and showing a pair of actuated strut assemblies pivotably mounted on a common frame.
Figure 7:
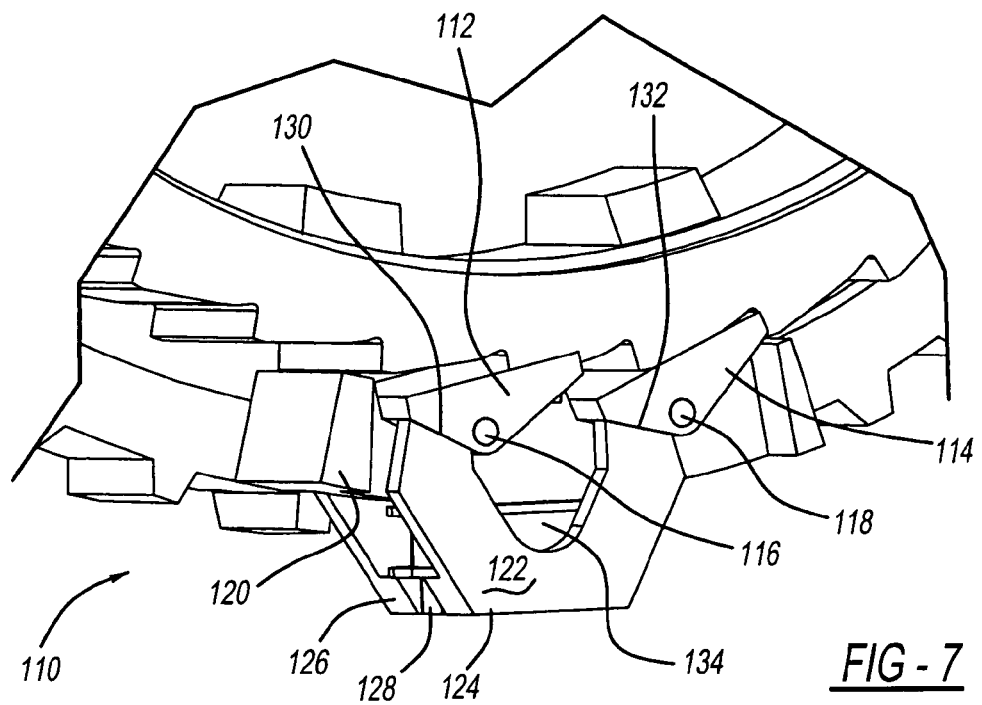
FIG. 7 is a detailed view of an alternate embodiment of an actuation module associated with the clutch module and showing a pair of actuated strut assemblies pivotably mounted on a common frame and using a common coil to actuate the struts.
Figure 8:
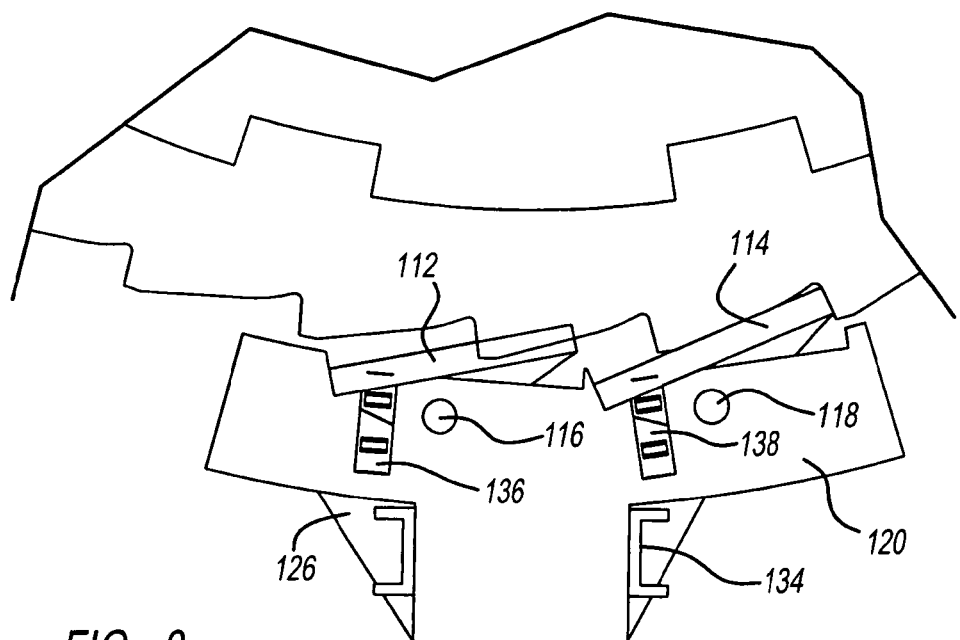
FIG. 8 is a sectional view of the actuation module of FIG. 7.

As can be seen in FIG. 6, an alternative strut actuation module 14a is generally similar to strut actuation module 14 of FIG. 2, except that a pair of strut and coil assemblies are mounted to a common frame 18'. Each strut and coil assembly is identified by common reference numerals but have "a" and "b" suffixes. Accordingly, all of the coils 36a and 36b (e.g., two in the embodiment shown) will work together to magnetize the housing, therefore increasing the magnetic field intensity and generating a greater magnetic force in the struts 20a, 20b and attracting them toward the closed position from the open position Referring now to FIGS. 7 and 8, there is provided an alternate embodiment of a strut actuation module 110 for use with clutch assembly 10. Strut actuation module 110 includes a pair of pivotal engagement struts 112 and 114 which pivot on pins 116 and 118 respectively, and are attached to a frame 120. A U-shaped member 122 is provided which includes a front U-shaped member 124 and a rear U-shaped member 126 which are magnetically and electrically coupled to one another through connection leg 128. Front U-shaped member 124 includes a pair of outer peripheral end portions 130 and 132 which engage the front sides of the struts 112 and 114. Rear U-shaped member 126 includes a pair of inner peripheral end portions (not shown) which are generally aligned respectively with outer peripheral end portions 130 and 132 and which engage the rear sides of struts 112 and 114. A single central bobbin 134 and coil 136 energizes the U-shaped members 124 and 126 for providing the coordinated actuation of the multiple struts. It will be readily appreciated that while two struts are shown, this invention could be configured to actuate more than just two struts if desired. As shown in FIG. 8, biasing springs 138 and 140 are provided for normally biasing the struts 112 and 114 into a freewheeling position. FIGS. 7 and 8 illustrate energization of coil 136 causing struts 112, 114 to be moved into engagement with ratchet teeth 17 on second clutch member 16.

Figure 9:
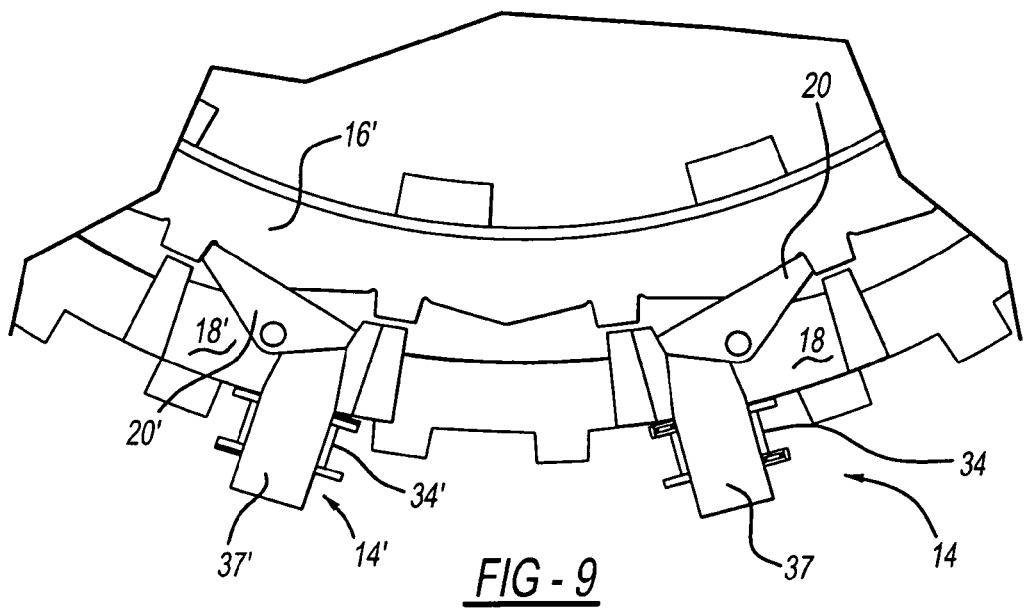
FIG. 9 is a detailed side view of a clutch assembly having a bi-directional clutch module and a pair of actuation modules oriented for operating in the bi-directional clutch module.

FIG. 9 shows the use of mirror image strut actuation modules 14 and 14' of the type shown in FIGS. 1-4 and as discussed above. Where the mirror image parts are labeled with prime numbers. The second clutch member 16' in this embodiment includes bi-directional cam members 17 and 17'. In operation, either actuation module, or sets of modules 14 or 14' can be energized depending on the direction which is desired for engaging and rotating the second clutch member 16'. Accordingly, FIG. 9 illustrates a bi-directional selectable clutch assembly.

Figure 10:
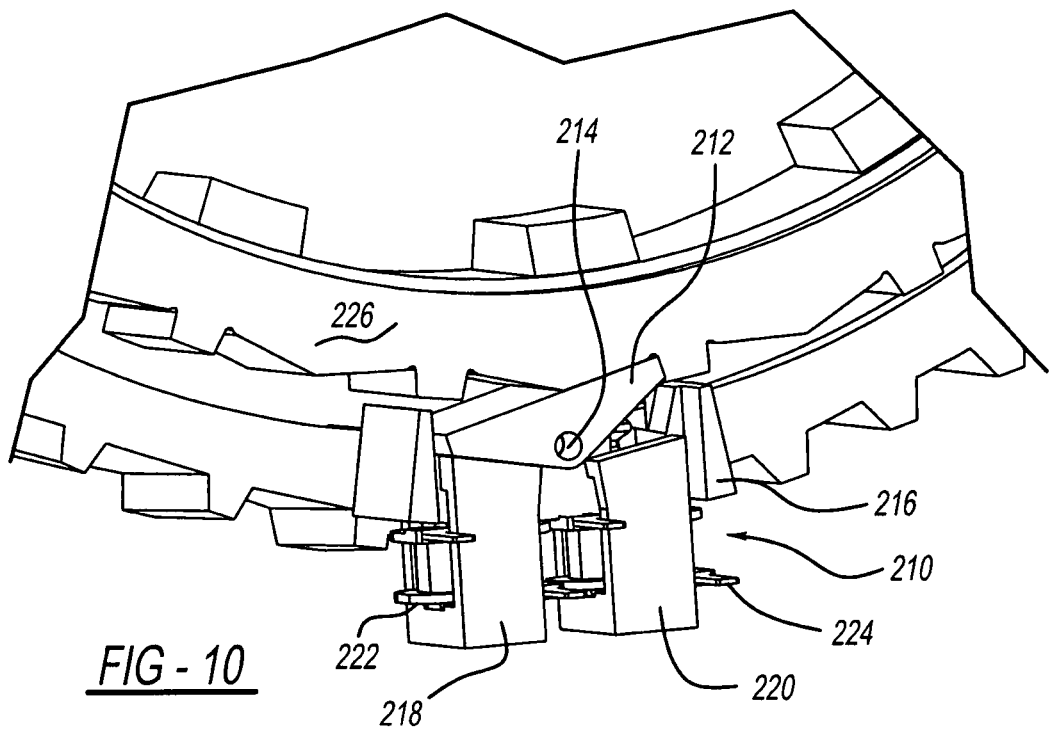
FIG. 10 is an alternate embodiment of a bi-directional actuation module showing a pair of coils operating a common pivotal strut.
Figure 11:
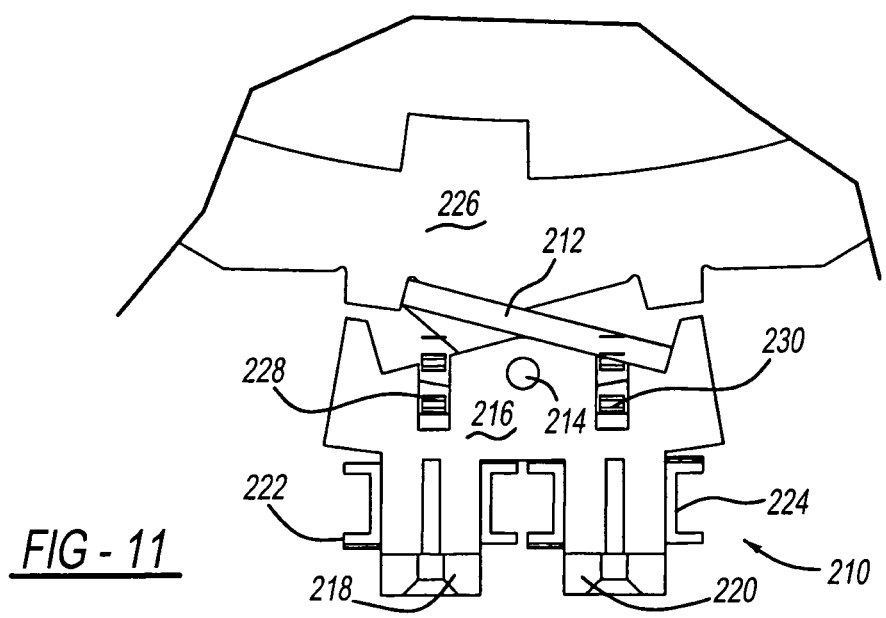
FIG. 11 is a sectional view of the bi-directional actuation module of FIG. 10.

Referring now to FIGS. 10 and 11 there is shown a second embodiment of a bi-directional strut actuation arrangement 210. In this embodiment a symmetrical strut member 212 is pivotally attached by a pin 214 to a frame 216. A pair of U-shaped members 218 and 220 with separate coil and bobbin assemblies 222 and 224 are used to selectively actuate the strut 212 from a first or freewheel position. Biasing springs 228 and 230 are provided for biasing the strut 212 to the free-wheeling position. FIG. 10 shows first coil/bobbin assembly 218 energized to cause strut 212 to move until end 212a engages cam surface 17 on clutch member 226 and prevent relative rotation in a first direction. In contrast, FIG. 11 shows second coil/bobbin assembly 220 energized to cause strut 212 to move until its end 212b engages cam surface 17' on clutch member 226 and prevent relative rotation in a second direction.

Figure 12:
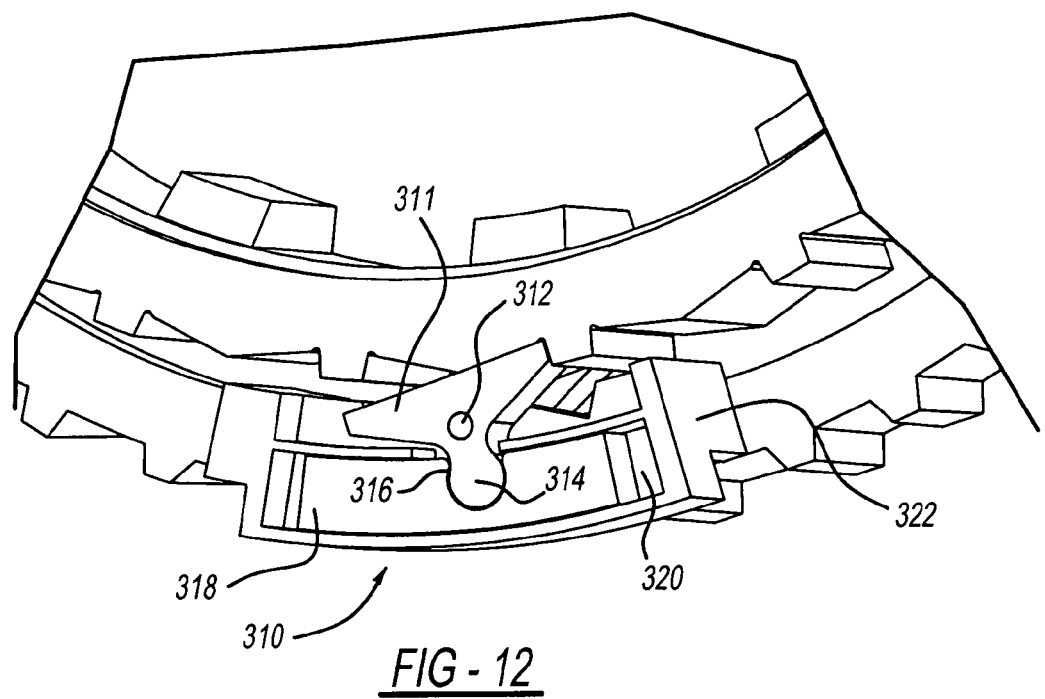
FIG. 12 is a sectional view of an alternate embodiment of a bi-directional actuation module using a mechanical actuation.
Figure 13:
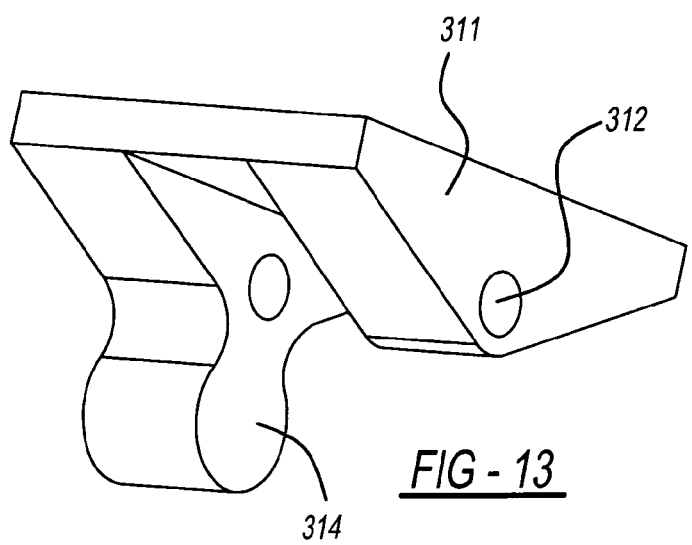
FIG. 13 is a perspective view of the strut member shown in FIG. 12.

Referring now to FIGS. 12 and 13, there is provided an alternate embodiment of a two way clutch actuation module 310. In this embodiment, a strut 311 is provided which is pivotal about a pin 312 by way of an actuation arm 314 which is engaged by a corresponding orifice 316 in an actuation slider 318 with slides in a track 320 formed in frame 322. In this embodiment the slider 318 may be powered by any number of mechanisms such as hydraulics, pneumatics, a solenoid, a servo, a ball screw arrangement, stepper motor, or the like for moving the sliding member back and forth in the track for actuation of the strut in an opposite direction.

In a further alternate embodiment, a bi-directional actuation module may be provided by using a permanently magnetized symmetrical strut member with a U shaped member which has legs on either side of the pivot. In this embodiment, the frame includes a pin portion extending from the frame and having and insulated bobbin with an energizable coil surrounding the bobbin. The U-shaped member includes a pair of actuation legs attached to said pin member and extends between a first polarized end of said strut and a second peripheral end of said leg being adjacent to a second polarized end of said strut. In this embodiment when the coil is energized the peripheral ends of said legs are polarized for moving said strut to a first position and when energized in an opposite direction the legs are polarized for moving the strut in an opposite direction.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A clutch assembly comprising:
a clutch module including a first clutch member and a second clutch member arranged to permit relative rotation therebetween, said second clutch member having a plurality of ratchet-type first cam surfaces formed therein; and
a strut actuation module including a frame mounted to said first clutch member, a strut pivotally moveable with respect to said frame and including an engagement end and a base end, a post member extending from said frame, an insulated bobbin mounted on said post member with an energizeable coil surrounding said bobbin, and a U-shaped member including a pair of actuation legs attached to said post member and forming a magnetic gap between said base end of said strut and peripheral ends of said actuation legs, such that when said coil is energized said peripheral ends of said actuation legs are polarized in a first polarity and said frame and said strut are polarized with an opposite polarity thereby biasing said strut toward said peripheral ends of said actuation legs and causing said engagement end of said strut to pivot into engagement with one of said first cam surfaces formed on said second clutch member.

2. The clutch assembly of claim 1 wherein said strut is pivotable about a pin secured to said frame.

3. The clutch assembly of claim 1 wherein said strut is pivotable in a pocket formed in said frame.

4. The clutch assembly of claim 1 further comprising a plurality of said strut actuation modules.

5. The clutch assembly of claim 4 wherein said plurality of strut actuation modules are positioned to be circumferentially spaced and each has a frame mounted to said first clutch member.

6. The clutch assembly of claim 1 wherein said strut module further includes a biasing member arranged between said frame and said base end of said strut for normally biasing said strut such that its actuation end is disengaged from said first cam surfaces.

7. The clutch assembly of claim 1 wherein said plurality of first cam surfaces are formed on said second clutch member for engagement in a first rotary direction and a plurality of second cam surfaces are formed on said second clutch member for engagement in a second rotary direction, wherein said strut of said strut actuation module is arranged to selectively engage one of said first cam surfaces, and further comprising a second strut actuation module having a second strut arranged for selectively engaging one of said second cam surfaces.

8. The clutch assembly of claim 7 wherein said strut associated with said strut actuation module is pivotal in a first direction for engaging said one of said plurality of said first cam surfaces and said second strut associated with said second strut actuation module is pivotal in a second direction for engaging one of said plurality of said second cam surfaces.

9. The clutch assembly of claim 7 wherein a first coil associated with said strut actuation module is used for pivoting said strut in a first direction and a second coil associated with said second strut actuation module is used for pivoting said second strut in a second direction.

10. A bi-directional clutch assembly comprising:
a first clutch member supporting at least one strut actuation module; and
a second clutch member having a plurality of first cam surfaces for engagement in a first rotary direction and a plurality of second cam surfaces for engagement in a second rotary direction, and wherein said at least one strut actuation module is configured for selectively engaging said first and second cam surfaces;
said strut actuation module including a first strut and a second strut both pivotally moveable with respect to a frame, said first strut being pivotal in a first direction for engaging one of said plurality of first cam surfaces and said second strut being pivotal in a second direction for engaging one of said plurality of second cam surfaces, said strut actuation module further including a first energizeable coil assembly, a first U-shaped housing member, and a first biasing member, said frame defining a first pole piece and a first spring retainer, said first strut being pivotally mounted to said frame and having a base portion and an engagement portion, said first coil assembly mounted on said first pole piece and said first U-shaped housing member being mounted to said first pole piece to enclose said first coil assembly, said first U-shaped housing member having a pair of laterally-spaced legs straddling said frame and having end segments defining an air gap with said base portion of said first strut, said first biasing member being disposed in said first spring retainer and engaging said base portion of said first strut so as to normally locate said engagement portion of said first strut in a free-wheel position relative to said first cam surfaces when said first coil assembly is non-energized, and wherein energization of said first coil assembly causes said base portion of said first strut to be magnetically attracted toward said end segments of said legs on said first U-shaped housing member for causing said first strut to pivot and locate its engagement portion in a locked position engaging one of said first cam surfaces so as to prevent relative rotation between said first and second clutch members in said first rotary direction.

11. The bi-directional clutch assembly of claim 10 wherein said strut actuation module further includes a second energizeable coil assembly, a second U-shaped housing member, and a second biasing member, said frame defining a second pole piece and a second spring retainer, said second strut being pivotally mounted to said frame and having a base portion and an engagement portion, said second coil assembly mounted on said second pole piece and said second U-shaped housing member being mounted to said second pole piece to enclose said second coil assembly, said second U-shaped housing member having a pair of laterally-spaced legs straddling said frame and having end segments defining an air gap with said base portion of said second strut, said second biasing member being disposed in said second spring retainer and engaging said base portion of said second strut so as to normally locate said engagement portion of said second strut in a free-wheel position relative to said second cam surfaces when said second coil assembly is non-energized, and wherein energization of said second coil assembly causes said base portion of said second strut to be magnetically attracted toward said end segments of said legs on said second U-shaped housing member for causing said second strut to pivot and locate its engagement portion in a locked position engaging one of said second cam surfaces so as to prevent relative rotation between said second and second clutch members in said second rotary direction.

12. The bi-directional clutch assembly of claim 11 further including at least two strut actuation modules.

13. The bi-directional clutch assembly of claim 11 wherein said frame includes a first frame and a second frame, wherein said first frame defines said first pole piece and said first spring retainer and is configured to pivotably support said first strut, and wherein said second frame defines said second pole piece and said second spring retainer and is configured to pivotably support said second strut.

14. A selectable clutch assembly, comprising:
a clutch module including a first clutch ring and a second clutch ring arranged to facilitate relative rotation there between in first and second rotary directions; and
a strut-type actuation module including a frame, a pivotal strut, an energizeable coil assembly, a U-shaped housing member, and a biasing member, said frame being mounted to said first clutch member and defining a pole piece and a spring retainer, said strut being pivotally mounted to said frame and having a base portion and an engagement portion, said coil assembly mounted to said pole piece and said U-shaped housing member mounted to said pole piece to enclose said coil assembly, said U-shaped housing member having a pair of laterally-spaced legs straddling said frame and having peripheral ends defining an air gap with said base portion of said strut, said biasing member being disposed in said spring retainer formed in said frame and engaging said base portion of said strut so as to normally locate said engagement portion of said strut in a free-wheel position relative to ratchet teeth formed on said second clutch ring when said coil is non-energized, and wherein energization of said coil causes said base portion of said strut to be attracted toward said peripheral ends of said legs on said U-shaped housing in opposition to the biasing exerted by said biasing member for causing said strut to pivot and locate said engagement portion in a locked position engaging one of said ratchet teeth and preventing relative rotation between said first and second clutch rings in said first rotary direction.

15. The selectable clutch assembly of claim 14 wherein said strut-type actuation module further includes a second pivotal strut pivotally mounted to a second frame, a second energizeable coil assembly mounted on a second pole piece extending from said second frame, a second U-shaped housing mounted to said second pole piece and enclosing said second coil assembly, said second U-shaped housing member having a pair of laterally-spaced legs straddling said second frame and having peripheral ends defining an air gap with a base portion of said second strut, a second biasing member acting on said base portion of said second strut to normally locate said engagement portion of said second strut in a free-wheel position to ratchet teeth on said second clutch ring.

16. The selectable clutch assembly of claim 15 wherein said second strut is pivotable relative to a set of second ratchet teeth formed on said second clutch ring to selectively prevent relative rotation in said second rotary direction in response to energization of said second coil assembly.

17. A selectable clutch assembly, comprising:
a clutch module including a first clutch member and a second clutch member arranged to permit relative rotation therebetween; and
a first strut actuation module including a first frame, a first energizeable coil assembly and a first U-shaped housing member, said first frame being mounted to said first clutch member and supporting a first strut for pivotal movement relative to first cam surfaces formed on said second clutch member, said first coil assembly being mounted to said first frame, said first housing member being mounted to said first frame so as to enclose said first coil assembly and having a pair of laterally-spaced first legs straddling said first frame, said first strut being moveable between a free-wheel position disengaged from said first cam surfaces and a locked position engaged with one of said first cam surfaces, wherein said first strut is located in its free-wheel position when said first coil assembly is de-energized, and wherein energization of said first coil assembly causes said first strut to be magnetically attracted to said first legs of said first housing member for causing said first strut to move into its locked position and preventing relative rotation between said first and second clutch members in a first rotary direction.

18. The selectable clutch assembly of claim 17 further comprising a second strut actuation module including a second frame, a second energizeable coil assembly and a second U-shaped housing member, a second frame being mounted to said first clutch member and supporting a second strut for pivotal movement relative to second cam surfaces formed on said clutch member, said second coil assembly being mounted to said second frame, said second housing member being mounted to said second frame so as to enclose said second coil assembly and having a pair of laterally-spaced second legs straddling said second frame, said second strut being moveable between a free-wheel position disengaged from said second cam surfaces and a locked position engaged with one of said second cam surfaces, wherein said second strut is located in its free-wheel position when said second coil assembly is de-energized, and wherein energization of said second coil assembly causes said second strut to be magnetically attracted to said second legs of said second housing member for causing said second strut to move to its locked position and preventing relative rotation between said first and second clutch members in a second rotary direction.

19. The selectable clutch assembly of claim 18 wherein said first strut actuation module includes a first biasing member for normally biasing said first strut toward its free-wheel position, and wherein said second strut actuation module includes a second biasing member for normally biasing said second strut toward its free-wheel position.

20. The selectable clutch assembly of claim 18 wherein said first frame includes a first pole piece about which said first coil assembly is disposed and to which said first housing member is secured, and wherein said second frame includes a second pole piece about which said second coil assembly is disposed and to which said second housing member is secured.

* * * * *